United States Patent [19]

Patrick

[11] 4,063,607
[45] Dec. 20, 1977

[54] MOTORIZED MECHANICAL HORSE

[76] Inventor: James E. Patrick, General Delivery, Mayflower, Ark. 72106

[21] Appl. No.: 705,871

[22] Filed: July 20, 1976

[51] Int. Cl.² .............................................. B62D 11/04
[52] U.S. Cl. .................................. 180/6.5; 280/1.206
[58] Field of Search ................. 180/6.5, 2; 280/1.195, 280/1.206; 119/29; 273/105.2

[56] References Cited
U.S. PATENT DOCUMENTS 1,489,701 4/1924 Geiser ...................................... 180/2
2,253,096 8/1941 Sheldon .............................. 280/1.195
3,303,821 2/1967 Harris .................................... 180/6.5
3,340,941 9/1967 Nev ....................................... 180/6.5

Primary Examiner—Joseph F. Peters, Jr.
Assistant Examiner—John A. Pekar
Attorney, Agent, or Firm—Raymond N. Matson

[57] ABSTRACT

A vehicle in the shape of a saddled and bridled horse which teaches the fundamentals of horsemanship by responding to the reins in the manner in which a real horse would.

4 Claims, 8 Drawing Figures

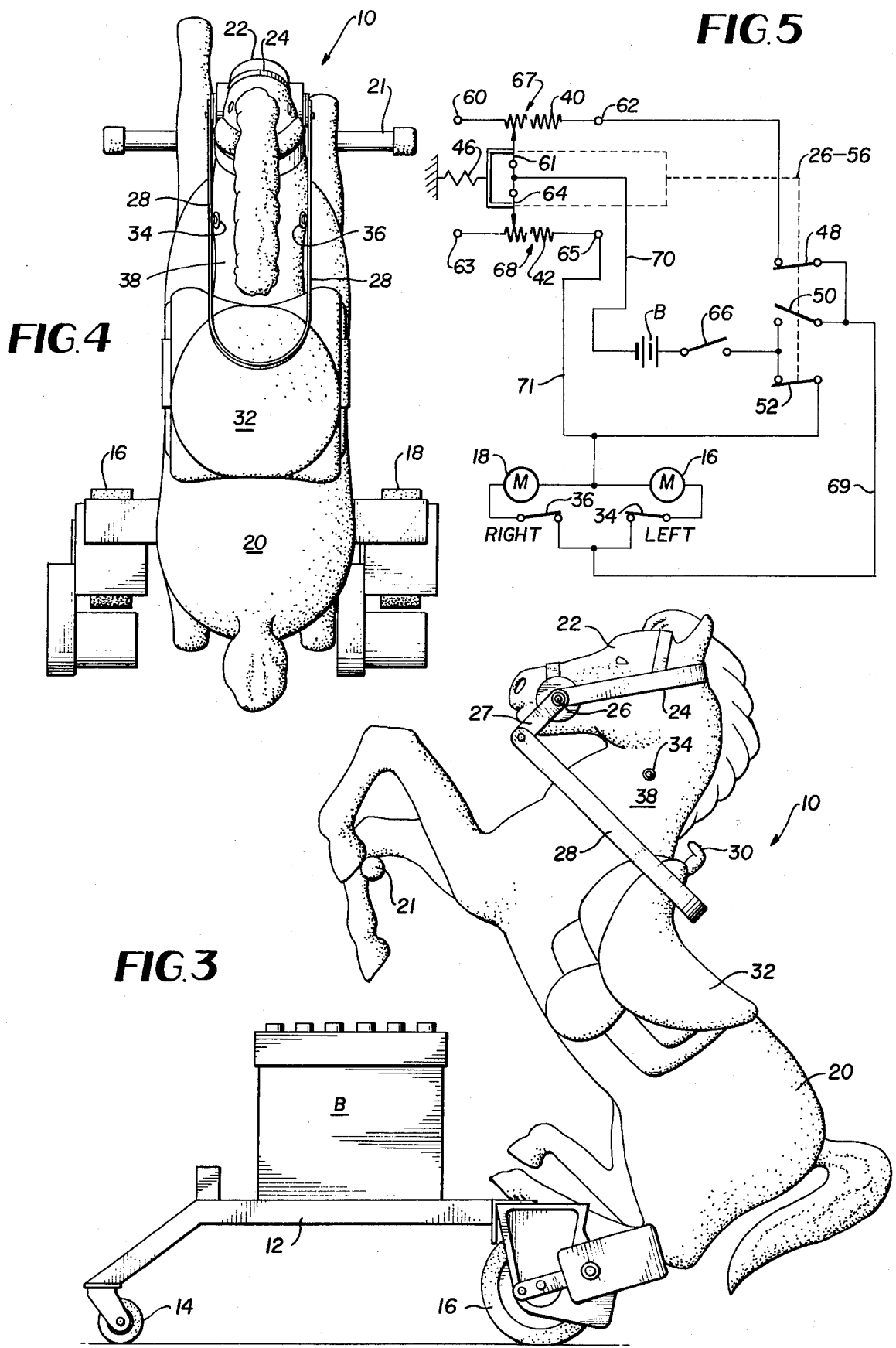

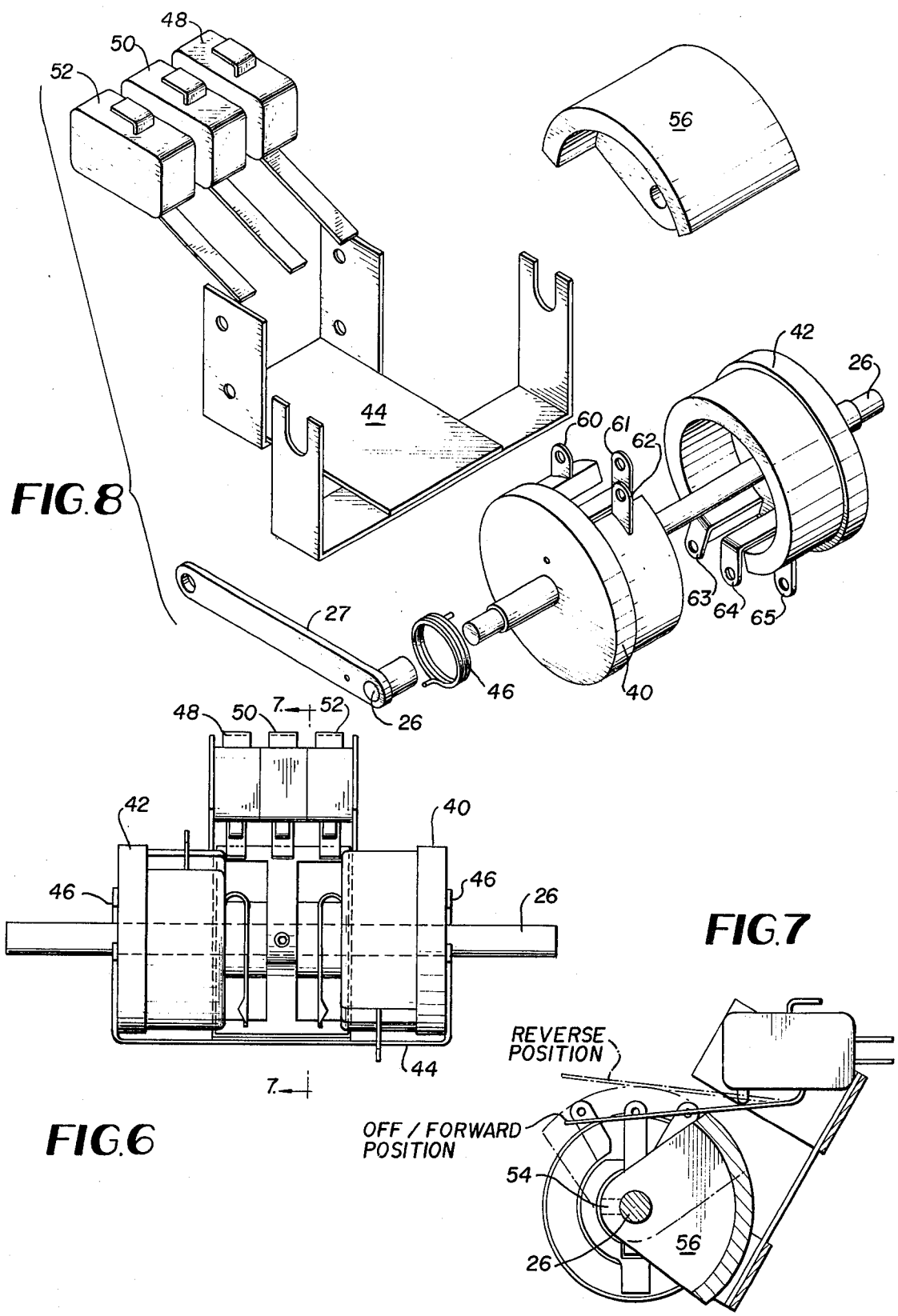

MOTORIZED MECHANICAL HORSE

This invention relates to a device for the teaching of horsemanship and its accompanying responsibilities.

Devices of this general type are known in the art but insofar as is known, none of these are capable of functioning in the manner of a real horse under the control of only the reins.

Accordingly, the main object of the present invention is to provide a device which has the ability to teach a young person 6 years old and under) the fundamentals of horsemanship and responsibility in a safe manner and eliminates the expense of owning a real horse.

An important object of the present invention is to provide a motorized device which requires the same steps of a rider as a horse does to make it go forward, stop, back up or turn.

Another important object of the present invention is to provide a motorized mechanical horse which will automatically stop if the rider falls off to thus prevent any injury thereto.

A further important feature of the present invention is to provide a motorized mechanical horse which enables the rider to learn the responsibilities of keeping and feeding a real horse.

Other objects and advantages of the present invention will become apparent during the course of the following description.

In the drawings, I have shown one embodiment of the invention. In this showing:

FIG. 3 is a view similar to FIG. 1 except that the horse shaped body has been tilted upwardly to show the mounting of the battery power source on the frame;

FIG. 4 is a top plan view of the invention;

FIG. 5 is a schematic wiring diagram of the electric circuits envolved;

FIG. 6 is a front elevational view of the control rheostats which are mounted in the nose of the motorized horse;

FIG. 7 is a vertical sectional view thereof taken on the line 7—7 of FIG. 6; and FIG. 8 is an exploded view thereof.

Figure 1:
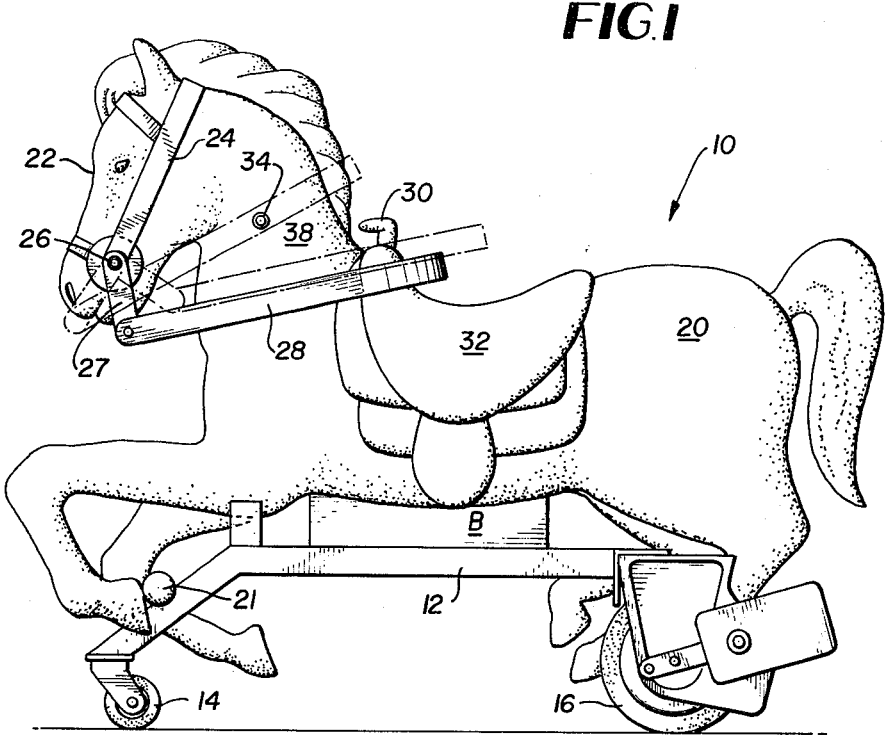
FIG. 1 is an elevational view of the left side of the motorized mechanical horse comprising the present invention.
Figure 2:
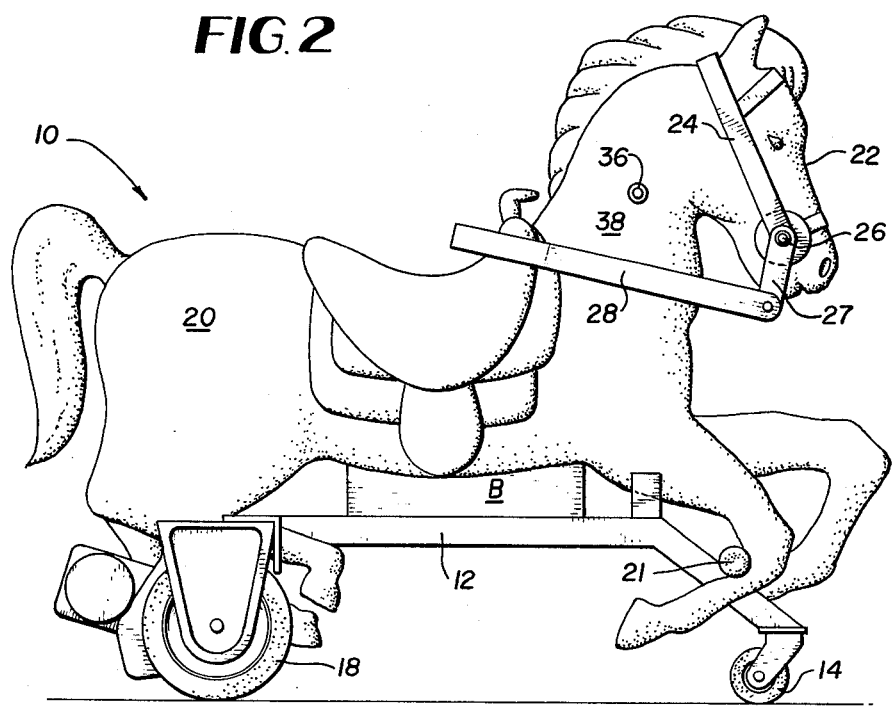
FIG. 2 is a similar view of the right side thereof.

Referring to the drawings, numeral 10 designates the motorized mechanical horse as a whole which comprises a supporting frame 12, a single forward-end-supporting wheel 14 which swivels, a pair of commercially available, individually motorized left and right rear wheels 16 and 18, a power supply in the form of a battery B rigidly mounted on the frame; and a body 20 in the form of a horse having a bar 21 to support the feet.

The horse body 20 is provided with a head 22 and a bridle 24 having a bit 26 and bit shanks 27 controlled by rigid reins 28 which are pivoted thereto and extend around the horn 30 of a western type saddle 32. Switches 34 and 36, operable by the reins 28, are respectively mounted in the left and right sides of the horse's neck 38 to respectively open the circuit to the right motorized wheel 18 and to the left motorized wheel 16.

The bit 26 (FIGS. 6, 7 and 8) is actually the shaft upon which the forward and reverse rheostats 40 and 42 are mounted in a switch-rheostat supporting bracket 44. The bit shaft 26 is provided with a coil spring 46 on each end adjacent its rheostat so that if the operator falls from the horse, the rheostat will automatically return to the off position.

The electrical operation of the device is shown in FIG. 5 while the physical relationship of the parts is shown in FIGS. 6–8.

When the rigid reins 28 are moved forwardly, the bit shaft 26 is rotated by the shanks 27 to operate both the forward rheostat 40, the reverse rheostat 42, and the reversing cam 56. This simultaneously actuates microswitches 48, 50 and 52 in an appropriate shaft rotation position as set by set screw 54. The shaft 26 which mechanically moves both rheostat arms and microswitches 48, 50 and 52 in synchronism is denoted schematically by a dot-dash line.

The motor drive circuit operates as follows: The forward and reverse rheostats 40 and 42 respectively have movable arm contacts connected to leads 61 and 64 which are positioned by the reins forwardly and rearwardly for speed control. The springs 46 (shown schematically) cause the arms to return to the "off" position with the loss of rider control.

As shown at gaps 67 and 68, the rheostats are preferably opened so that no battery connection is made until the arms are moved into contact with the active (right hand) sections of rheostats 40 and 42. Thus, on-off switch 66 opens and closes the battery circuit as desired and could be controlled by a key or coin operated switch. As the reins are moved to the right past the dead zone, the resistance to the wheel motors is reduced thus increasing the motor speeds.

For right or left turns, one of the corresponding switches 34 or 36 is actuated by rein pressure to cut off one motorized wheel 18 or 16 to effect a turning of the horse in the appropriate direction.

When the reins 28 are pulled rearwardly to make the horse back-up, the cam 56 changes the position of switches 48, 50 and 52 simultaneously from the position shown when forward rheostat 40 is connected by way of lead 69 to the outer motor terminals and through the speed control rheostat 40 by lead 70 to the battery positive pole.

Then, in reverse position by way of lead 70 and rheostat 42, the positive battery terminal is connected by lead 7 to the opposite (inner) motor terminals with switch 92 open. Switch 50 then connects the negative battery terminal by way of lead 69 to the outer motor terminals. Thus as the reins 28 control the shaft 26 and the switches 34 and 36, the movement, speed and direction of the horse is accordingly controlled.

It will be readily apparent that the frame 12 can be omitted and the wheels attached directly to the body 10 with the battery, switches, etc., mounted on brackets within the body proper.

As earlier set forth, the present invention teaches horsemanship and the responsibility of housing and feeding a horse to a younster without the necessity of his owning a real horse.

In riding the motorized horse, the rider must perform the basic steps he or she would perform on a real horse. The motorized horse, as described, will move forward at a variable speed by pushing the rigid reins 28 forwardly to rotate the bit shanks 27 forwardly, the further forward, the faster the horse 10 will go.

If the reins are returned to the original position, the horse will stop. If the rider should fall from the horse 10, the springs 46 will return the reins 28 to the stop position which is an important safety feature of the invention. If the rider wishes to back up, he or she may do so at a variable speed by pulling the rigid reins 28 rearwardly.

The turning of the horse to the left or right is readily effected by "neck reining" the horse. This is effected by laying the bridle reins 28 against the horse's neck 38 which causes the horse to turn in the appropriate direction. In order to turn left, the rider pushes the rigid reins 28 forwardly and lays them against the switch 36 on the right side of the horses neck. This breaks the circuit to the left motorized wheel 16 so that only the right wheel is driving to spin or turn the motorized horse 10 to the left. Conversely, to turn to the right, the reins 28 are placed against the left side of the horse's neck to operate switch 34 to deenergize the right drive wheel 18.

The horse 10 also may teach a child responsibility in housing or feeding a horse. For example, a particular area should be designated to store the horse with the rider having the duty to see that the horse is always left there. The equivalent of feeding the horse is the charging of its battery. The rider should be required to "plug-up" the battery charger which will enable the horse 10 to be ready for the next ride.

It need not be emphasized that the horse 10 does not bite, buck, kick, etc.

It is to be understood that the form of my invention herewith shown and described is to be taken as a preferred example of the same, and that various changes in the shape, size and arrangement of parts may be resorted to without departure from the spirit of the invention or the scope of the subjoined claims. What is claimed is:

1. A motorized mechanical horse comprising, in combination, a body simulating a horse and having a bridle and rigid reins pivotally connected to bit shanks fixed to the ends of a rotatable bit; a pair of individually motorized driving wheels supporting one end of said body and a swiveled wheel supporting the other end thereof; power means for operating said motorized wheels; and rheostats including rotatable contacts mounted on said bit, to energize said motorized wheels in a forward or reverse direction at variable speeds upon forward or reverse movement of said rigid reins to rotate said bit mounted contacts.

2. The combination recited in claim 1; and switch means mounted on each side of said body and selectively engageable by said rigid reins to deenergize one of said driving wheels to effect a steering of the horse.

3. The combination recited in claim 1; and spring means for returning said rotatable contacts to an off position upon release of said rigid reins.

4. The combination recited in claim 2; and spring means for returning said rotatable contacts to an off position upon release of said rigid reins.

* * * * *